United States Patent Office 3,781,422
Patented Dec. 25, 1973

3781,422
THERAPEUTIC SOLUTION OF IRON AND LIPOSOLUBLE VITAMINS
Manfred Bohn, Hofheim, Taunus, Germany, assignor to Farbwerke Hoechst Aktiengesellschaft vormals Meister Lucius & Bruning, Frankfurt am Main, Germany
No Drawing. Filed Oct. 13, 1971, Ser. No. 189,044
Claims priority, application Germany, Oct. 15, 1970, P 20 50 630.3
Int. Cl. A61k 27/00
U.S. Cl. 424—147                              9 Claims

ABSTRACT OF THE DISCLOSURE

A solution, useful for the joint parenteral administration of iron and certain liposoluble vitamins to young animals, comprising colloidally dissolved iron, an ionogenic surface-active agent, one or more liposoluble vitamins such as A, D, or E, and a non-ionogenic surface-active agent. Methods of making such a solution.

---

The present invention relates to a medicinal solution for parenteral administration of colloidal iron preparations which contain liposoluble vitamins, for example vitamin A, $D_3$ or E, preferably for use in veterinary medicine, and to a process for preparing it. The invention furthermore relates to a process for stabilizing the iron in a colloidal iron solution containing liposoluble vitamins.

It is known in modern intensive livestock breeding and management that the anemia affecting young animals, especially that affecting piglets, is due to an iron deficiency. Because of the rapid growth and the management of the animals, iron is not available in sufficient quantity in the milk of the mother animal. Therefore, the injection of iron preparations in the first days of life is necessary.

For this purpose, colloidal iron solutions in the form of complex compounds of tri-valent iron with depolymerized polysaccharides are mainly used (cf. German Pat. 938,502 *). These complex compounds are easily soluble in water, giving a colloidal solution, up to a concentration of about 100 mg. of iron per milliliter of solution. However, it is also possible to use the iron in the form of other preparations.

In order to meet vitamin requirements and to increase resistance to diseases in breeding, in the first days of their life the animals are given vitamin injections, for example vitamins A, $D_3$ and E, with vitamin $D_3$ being the most important by reason of its regulating action in calcium and phosphorus metabolism, which is of importance especially for a rapidly growing young organism.

In order to reduce the number of injections, attempts have been made to develop combination preparations which contain iron and fat-soluble vitamins. But all attempts to prepare such combination preparations failed.

It is known from the literature that aqueous solutions of vitamins which are not soluble in water can be obtained using various non-ionogenic surface-active substances (cf. for example, British Pat. No. 946,086, U.S. Pat. 3,149,037, Austrian Pat. No. 177,886).

However, it has been found that incompatibilities occur between colloidal iron solutions and non-ionogenic solubilizers. When only small amounts of non-ionogenic surface-active substances are added to colloidal iron solutions, the originally clear iron solutions decompose even after a short time.

In view of these results of the experiments, the preparation of stable iron solutions containing liposoluble vitamins seemed not feasible.

Now, we have found that, surprisingly, stable colloidal iron solutions containing liposoluble vitamins can be prepared using mixtures of non-ionogenic and ionogenic surface-active substances.

As the vitamins, the known liposoluble vitamins such as vitamins A, E, the vitamins of the D series and especially vitamin $D_3$ are used.

As colloidal iron solutions, especially the iron-dextran complexes obtained according to German Pat. 938,502 are used according to the invention.

As surface-active non-ionogenic substances used according to the invention, there may be mentioned, for example polyethylene glycol derivatives of fatty acids, fat alcohols, fatty oils and sorbitan-fatty acid esters, preferably polyethylene-glycol-sorbitain mono-esters of higher aliphatic monocarboxylic acids. As examples, the polyoxyethylene - sorbitan—monolaurate, -monopalmitate, -monostearate or -monooleate, polyoxyethylated castor oil or polyoxyethylene stearate may be mentioned.

The ionogenic surface-active substances used according to the invention are, for example salts, especially alkali metal salts, of sulfurated or sulfonated higher fatty acid or fat alcohol derivatives, preferably the alkali metal salts of lauryl-sulfuric acid or alkali-lauryl ether sulfates such as sodium-lauryl sulfate or sodium-lauryl sulfonate.

The vitamins may be used as such or in the form of their derivatives, for example as vitamin A-palmitate.

The quantities of the individual components may vary within wide limits. Thus, the medicinal solution of the invention may contain, per milliliter, about 10 to 125 mg., pregerably 50 to 100 mg., of colloidally dissolved iron, furthermore at least one liposoluble vitamin, for example about 10,000 to 50,000 I.U., preferably 10,000 to 25,000 I.U. of vitamin A, about 10,000 to 150,000 I.U., preferably 25,000 to 50,000 I.U., of vitamin $D_3$ or about 5 to 30 mg., preferably 7.5 to 10 mg., of vitamin E, and 0.2 to 20%, preferably 0.5 to 10% of a non-ionogenic surface-active agent and about 0.1 to 10%, preferably 0.25 to 5% of an ionogenic surface-active substance. If a pharmacologically tolerated organic solvent is added, its quantity is preferably in the range of 1 to 10%. The above percentages refer to the total weight of the finished preparations.

The medicinal solution of the invention is prepared by addition of the individual components. With a view to solubility, it may be of advantage, for example, first to dissolve the vitamin in the non-ionogenic surface-active substance, if necessary with gentle heating, and then to add this solution dropwise to the colloidal iron preparation which contains the ionogenic surface-active substance. If vitamin $D_3$ is used, it is suitable to dilute the vitamin-containing solution with a water-miscible pharmacologically tolerated organic solvent, for example with a suitable low molecular weight aliphatic alcohol, preferably ethanol or with dimethyl-acetamide, before adding it to the iron solution. If vitamin A or E is used, the dilution can also be made with water.

It is also possible, for example first to prepare a solution of the vitamin and to add it to the colloidal iron solution, which contains the ionogenic and non-ionogenic substance.

After combination of the components, the medicinal solution is in general filtered through a sterilization filter and then filled under aseptic conditions into sterilized bottles.

The present invention permits, for the first time, the combination of liposoluble vitamins with colloidal iron solutions without a separation of the originally clear iron solution occurring. This effect was surprising and was not foreseeable according to the state of the art.

The following examples illustrate the invention:

EXAMPLE 1

A solution of 75 mg. of vitamin $D_3$ (1 g.=40 mill. I.U.) in 750 mg. of polyoxyethylene-sorbitan-monolaurate and ---
*Corresponding to U.S. Pat. 2,820,740, Reissue 24,642.

4 ml. of ethyl-alcohol was added dropwise, while stirring, at room temperature to a solution of 400 mg. of sodium-lauryl sulfate in 90 ml. of aqueous colloidal iron solution (which contained, per 1 ml., the equivalent of 100 mg. of elementary 3-valent iron), and the whole was then combined with colloidal iron solution to a volume of 100 ml.

After filtration through a sterilization filter, the solution was filled under aseptic conditions into sterilized multiple use bottles.

EXAMPLE 2

The solution was prepared in a manner analogous to that described in Example 1. The following substances were used in the same order:

400 mg. of sodium lauryl-sulfonate
90 ml. of colloidal iron solution (as in Example 1)
150 mg. of vitamine $D_3$ cryst. (1 g.=40 mill. I.U.)
1.0 g. of polyoxyethylene-sorbitan-monooleate
6 ml. of dimethylacetamide
colloidal iron solution (as in Example 1) add 10 ml.

EXAMPLE 3

The solution was prepared in a manner analogous to that described in Example 1. The following substances were used in the same order:

400 mg. of sodium lauryl-sulfate
90 ml. of colloidal iron solution
150 mg. of vitamin $D_3$ cryst. (1 g.=40 mill. I.U.)
1 g. of polyoxyethylated castor oil
5 ml. of ethyl alcohol
colloidal iron solution (as in Example 1) add 100 ml.

EXAMPLE 4

A solution of 1 g. of vitamin A-palmitate (1 g.=1.7 mill. I.U.) in 10 g. of polyoxyethylene-sorbitan-monooleate and 30 ml. of distilled water was added dropwise, while stirring, at room temperature, to a solution of 2 g. of sodium lauryl sulfate in 60 ml. of colloidal iron solution (as in Example 1), and the whole was combined with colloidal iron solution to a volume of 100 ml. (as in Example 1).

After filtration through a sterilization filter, the solution was filled into bottles as described in Example 1.

EXAMPLE 5

A solution of 1 g. of vitamin E-acetate in 6 g. of polyoxy-ethylene-stearate and 30 ml. of distilled water, which solution had been prepared with gentle heating, was added dropwise, while stirring, at room temperature, to a solution of 2 g. of sodium-lauryl-sulfate in 60 ml. of colloidal iron solution (as in Example 1), and the whole was combined with colloidal iron solution (as in Example 1) to a volume of 100 ml.

The solution was then filled into bottles as described in Example 1.

What is claimed is:

1. An aqueous therapetutic solution containing, per milliliter, 10 to 125 mg. of colloidally dissolved iron present as complex of ferric iron and dextran; 0.2 to 20 percent of a non-ionogenic surface-active agent selected from the group consisting of polyoxyethylated fatty acids, polyoxyethylated fatty alcohols, polyoxyethylated fatty oils, and polyoxyethylated sorbitan-fatty acid esters; 0.1 to 10 percent of an ionogenic surface-active agent selected from the group consisting of alkali metal salts of higher fatty acid sulfonates and alkali metal salts of sulfated higher fatty alcohols; and at least one liposoluble vitamin selected from the group consisting of 10,000 to 50,000 I.U. of vitamin A, 10,000 to 150,000 I.U. of vitamin $D_3$, and 5 to 30 mg. of vitamin E.

2. A method for making a solution as in claim 1 which comprises dissolving said liposoluble vitamin and at least a portion of said non-ionogenic surface-active agent in water or in a water-miscible pharmacologically-tolerated solvent for said vitamin and combining the resulting solution with an aqueous solution of said colloidally-dissolved iron, said ionogenic surface-active agent, and any remaining non-ionogenic surface-active agent.

3. A solution as in claim 1 wherein said non-ionogenic surface-active agent is a member selected from the group consisting of polyoxyethylene sorbitan monolaurate, polyoxyethylene sorbitan monooleate, polyoxyethylated castor oil, and polyoxyethylene stearate.

4. A solution as in claim 1 wherein said ionogenic surface-active agent is sodium lauryl sulfate or sodium lauryl sulfonate.

5. A solution as in claim 1 which additionally contains a water-miscible pharmacologically-tolerated organic solvent for said vitamin.

6. A solution as in claim 1 containing, per milliliter, 50 to 100 mg. of colloidally dissolved iron.

7. A solution as in claim 1 containing, per milliliter, at least one liposoluble vitamin selected from the group consisting of 10,000 to 20,000 I.U. of vitamin A, 25,000 to 50,000 I.U. of vitamin $D_3$, and 7.5 to 10 mg. of vitamin E.

8. A solution as in claim 1 containing, per milliliter, 0.5 to 10 percent of said non-ionogenic surface-active agent.

9. A solution as in claim 1 containing, per milliliter, 0.25 to 5 percent of said ionogenic surface-active agent.

References Cited

UNITED STATES PATENTS 2,816,854  12/1957  Gross _____ 424—147
3,093,545   6/1963  Westfall et al. _____ 424—147

SAM ROSEN, Primary Examiner